Z. B. Sims,
Hoe.
No. 94,353.      Patented Aug. 31, 1869.
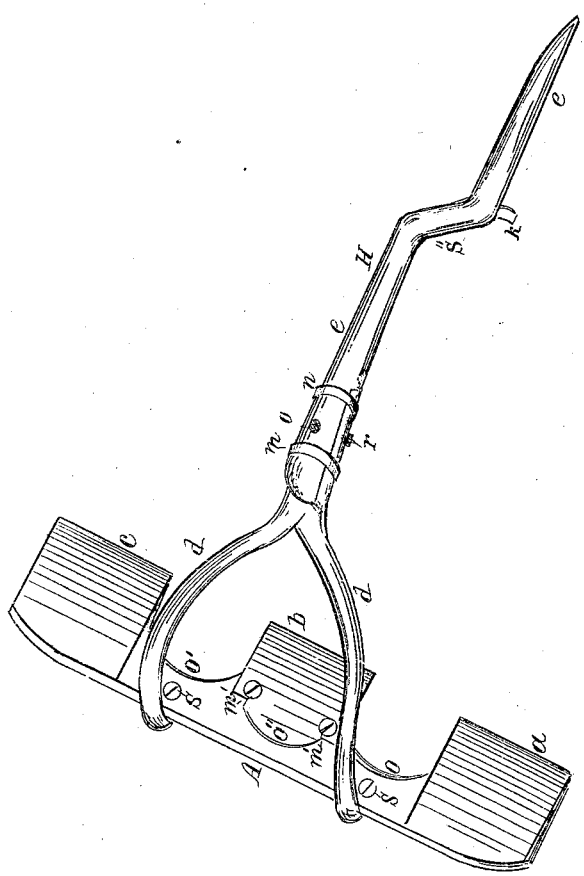
Witnesses:
Phil. F. Larner
Geo. W. Rothwell
Inventor:
Zachariah B. Sims,
By John A. Wiederskein
Atty.

UNITED STATES PATENT OFFICE.

ZACHARIAH B. SIMS, OF BONHAM, TEXAS.

IMPROVEMENT IN COTTON-HOES.

Specification forming part of Letters Patent No. 94,353, dated August 31, 1869.

*To all whom it may concern:*

Be it known that I, ZACHARIAH B. SIMS, of Bonham, in the county of Fannin and State of Texas, have invented a new and useful Improvement in Cotton-Hoes; and I do hereby declare the following to be a clear and exact description of the nature thereof sufficient to enable others skilled in the art to which my invention appertains to fully understand and use the same, reference being had to the accompanying drawing, making part of this specification, in which the figure represents a perspective view of my improved cotton-hoe.

Similar letters indicate like parts in the figure.

My invention relates to improvement in hoes for thinning cotton or other plants; and it consists in improvements in the construction of such hoes, as will hereinafter be more fully set forth. The usual practice in thinning cotton consists in the employment of an ordinary hoe, with which the operator passes along each row and removes the plants between others which are allowed to remain in bunches, to be afterward further thinned after all the plants in the field have been thus bunched. It is important that in each row the plants should stand at the same distance apart, the space between two plants in the row depending on the quality of the soil. Thus for poor land the distance between the plant in the row should be from six to ten inches, while in rich land the space between the plants should be from fifteen to twenty inches. Much time and trouble are necessary in thus spacing the plants to be thinned by the operator, and one of the objects of my invention is to obviate this difficulty and enable the operator to thin the plants with much greater facility and accuracy.

In the accompanying drawings, A is the back of the hoe, to which are permanently attached the cutters $a$ $c$.

$b$ is a cutter attached by screws $m$ $m$ to the lower parts of the arch $o''$ in the back of the hoe. The middle cutter, $b$, is removable, and is situated midway between the cutters $a$ $c$.

$o$ $o'$ are arched spaces in the lower part of the back of the hoe, between the middle and outer cutters.

$d$ $d$ are bent arms, suitably attached to the back of the hoe by the screws $s$ $s$ or otherwise.

H is the handle, attached by the bands $m$ $n$ to the sleeve $r$. The forward part of the handle represented by $e$ is straight.

$s$ represents a part of the handle which makes an angle with the part $e$. The part $l$ of the handle is made straight.

$k$ is a curved projection, situated at the end of a rod which passes through the angular portion $s''$ of the handle, thus strengthening that part of it. The hand of the operator grasps the handle about the junction of the angular part $s''$ with the straight part $e$, and the curved projection $k$ is used for the outer portion of the hand to come against, thus facilitating the operation of the implement. By this construcction of the handle it will been seen that the operator by pressing on the angular part $s''$ of the handle can readily raise or lower either end of the hoe, which in undulating ground is frequently necessary in thinning the plants.

In operating my hoe in thinning cotton the operator works the implement across the row, the cutters $a$ $b$ $c$ remove a portion of the young plants, leaving them in bunches between the cutters. The arches $o$ $o$ in the lower part of the back of the hoe prevent the young plants from being bruised in the operation of the hoe. A bunch is then left between the outer cutter, $c$, in the row, and the operation is repeated until the row is finished. The bunches are thus equally spaced in each row. After eight or ten days in rich land have elapsed the middle cutter, $b$, is removed and every alternate bunch is hoed up. In poor land the cutter $b$ is not removed. The arch $o''$, when the cutter $b$ is removed, prevents injury to the young plants from being bruised in operating the hoe. It is made higher than the arches $o$ $o$, as in the second use of the hoe the plant will be higher. The bunches can then be thinned out to a single plant, or nearly so, by the use of the hoe.

Having thus fully described my invention, what I claim as new, and desire to secure by Letters Patent, is—

1. The back A, provided at its lower part with the arches $o$ $o'$ $o''$, in combination with the cutters $a$ $c$ and removable cutter $b$, substantially as described.

2. The handle H, consisting of the straight portions $e$ $l$ and the angular part $s''$, substantially as described.

3. The handle H, constructed as described, in combination with the curved projections $k$, substantially as described.

ZACHARIAH B. SIMS.

Witnesses:
JOHN A. WIEDERSHEIM,
PHIL. F. LARMER.